Oct. 1, 1957    M. S. WOZNIAK    2,807,812

LATERALLY ADJUSTABLE TOOL HOLDER

Filed Jan. 20, 1955

INVENTOR
MITCHELL S. WOZNIAK
BY Joseph K. Schofield
ATTORNEY

United States Patent Office 2,807,812
Patented Oct. 1, 1957

2,807,812

LATERALLY ADJUSTABLE TOOL HOLDER

Mitchell S. Wozniak, Portland, Conn., assignor, by direct and mesne assignments, to Joseph T. Chase, Bloomfield, Conn.

Application January 20, 1955, Serial No. 483,033

2 Claims. (Cl. 10—89)

This invention relates to a tool holder adapted for mounting in the turret of a screw machine or other machine tool for supporting a cutting tool in position in alignment with the axis of rotation of a work piece being operated on.

A primary object of the present invention is to provide an improved but simple and rigid mounting for supporting a threading tool comprising a tap or die in position on the turret of a machine tool such as a screw machine turret lathe or the like.

Another object of importance is that the threading tool during operation may move axially relative to the supporting part of the holder held rigidly in the turret, the tool being normally resiliently urged in one direction by spring means.

And finally, it is an important object of the invention to provide for limited lateral adjustment of the tool to align its axis with the axis of the work piece being operated on.

With the above and other objects in view, the invention may include the features of construction and operation set forth in the following specification and illustrated in the accompanying drawing.

In the accompanying drawing annexed hereto and forming a part of this specification, I have shown the invention embodied in a single form of tool holder for supporting a cutting tool such as a tap or die in position on a face of a tool holding turret, but the invention may be otherwise embodied and the drawing is not to be construed as defining or limiting the scope of the invention, the claims appended to this specification being relied upon for that purpose.

Figure 1:
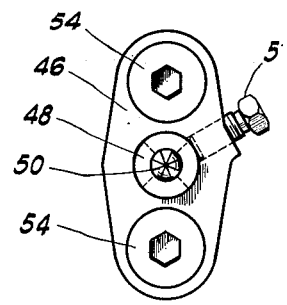
Fig. 1 is an end view of a tool holder forming the present invention.
Figure 2:
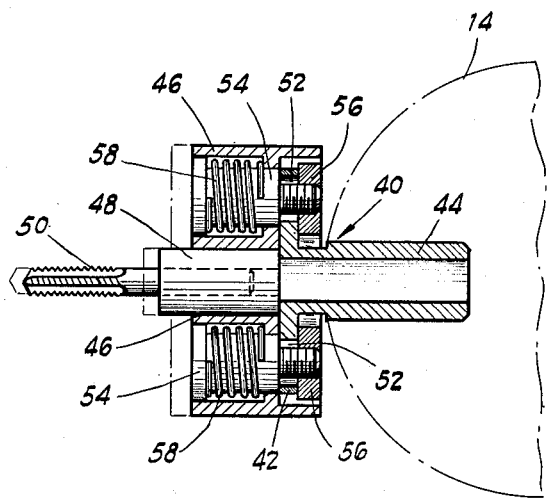
Fig. 2 is a longitudinal sectional view of a modified form of the invention.

In the above mentioned drawing there has been shown but one embodiment of the invention which is now deemed preferable, but it is to be understood that changes and modifications may be made within the scope of the appended claims without departing from the spirit of the invention.

Referring more specifically to the form of invention shown in the figures of the drawing, it will be seen that a member 40 having a head 42 is provided with a hollow shank 44 adapted to enter an opening in a turret 14. Bearing against the front face of the head 42, which is normal to the axis of the shank 44, is a tool holding member 46. Within the central outer portion of this holding member 46 is an adapter 48 for retaining a tool 50 such as a tap or other form of threading tool. A set screw 51 extending through the holding member 46 presses against the outer surface of the adapter 48 to retain the tool 50 in position.

The holding member 46 is provided with two openings 52 oppositely disposed and through which extend headed studs 54 which also pass through the head 42 of the supporting member 40. The openings 52 in the head through which the threaded ends of the studs 54 extend are enlarged so that limited lateral adjustment of the holding member 46 to different parallel positions is permitted. To tighten the studs 54 in adjusted positions a clamping plate 56 is provided engaging the free ends of the screw threads on the studs 54. This plate 56 bears against the opposite face of the head 42.

Surrounding the intermediate portions of the studs 54 are separate helically wound springs 58 the convolutions being widely enough spaced that the holding member 46 can move axially relative to the supporting member 40 to an axially advanced position indicated by dotted lines. Normally the holding member 46 will be held in the position shown in full lines by the action of the springs 58 but during operation the tool such as the tap 50 and its holding member 46 may advance at a faster rate than the supporting member 40 and turret by compression of the springs 58.

By the enlarged openings 52 in the head 42 of the supporting member 40 the lateral position of the tool 50 relative to the shank 44 may be adjusted to and retained in one of any parallel positions so that the axis of the tool 50 will be placed in alignment with the work piece being worked on.

The shank 44 of the body member is made hollow as shown so that tools, such as taps, may be used of standard length. The shanks of the taps may extend as far as necessary into the opening extending axially through the body member. By this means the necessity for special short taps or the cutting off of the shanks of standard length taps is avoided.

I claim as my invention:

1. A tool mounting device comprising a supporting member adapted for attachment to a turret, a tool holding member mounted for limited lateral adjustments on said supporting member, studs adjustably secured against and extending from said supporting member slidably entering said holding member to prevent relative rotation of the holding and supporting members, and resilient means individually surrounding said studs and urging said holding member toward said supporting member and permitting limited axial movement of the holding member from the supporting member.

2. A tool mounting device comprising a supporting member adapted to be attached to a turret, a tool holding member mounted thereon, headed studs outstanding from oppositely disposed positions of said supporting member and being secured there against in different lateral positions, said tool holding member having openings through which said studs may slide, and helically wound springs individually surrounding said studs housed within said holding member, and extending between said heads and a wall of said holding member normal to the axis of said holding member whereby said holding member may be adjusted limited distances laterally and may move axially against the pressure of said springs.

References Cited in the file of this patent

UNITED STATES PATENTS

| 1,458,948 | Meyer | June 19, 1923 |
| 1,702,810 | Buhr | Feb. 19, 1929 |
| 2,078,084 | Cote | July 13, 1937 |
| 2,392,809 | Cote | Jan. 15, 1946 |